Jan. 30, 1923.

J. W. SANDLIN.
PUMP VALVE.
FILED JUNE 13, 1921.

1,443,436.

INVENTOR.
James W. Sandlin
BY
Hardwey Cathy
ATTORNEYS.

Patented Jan. 30, 1923.

1,443,436

UNITED STATES PATENT OFFICE.

JAMES W. SANDLIN, OF HUMBLE, TEXAS.

PUMP VALVE.

Application filed June 13, 1921. Serial No. 477,307.

*To all whom it may concern:*

Be it known that I, JAMES W. SANDLIN, a citizen of the United States, residing at Humble, in the county of Harris and State of Texas, have invented certain new and useful Improvements in a Pump Valve, of which the following is a specification.

This invention relates to certain new and useful improvements in a pump valve.

One object of the invention is to provide, in a pump, a valve having upstanding and depending spiralled fins which cause successive partial rotation of the valve, with each stroke of the plunger, causing a uniform wear on the valve as well as the valve seat.

Another object is to provide a valve which is readily reversible in case it becomes worn which enables the valve to be continued in use after one side is worn and virtually doubles the life of the valve.

A further feature resides in the provision of a valve having fins which will sweep out the sand that may collect in and tend to clog the seat.

With the above and other objects in view the invention has particular relation to certain novel features of construction, operation and arrangement of parts, an example of which is given in this specification and illustrated in the accompanying drawings, wherein:—

Figure 2:
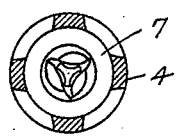
Figure 2 is a transverse sectional view.
Figure 1:
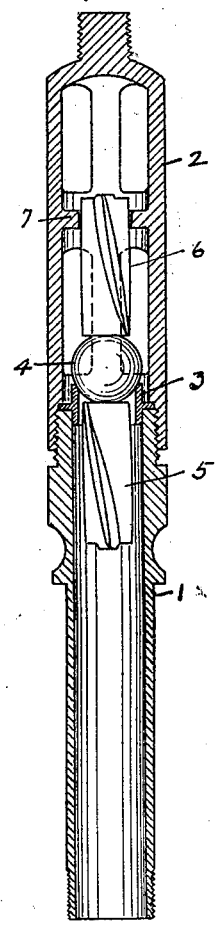
Figure 1 is a vertical sectional view of the device.
Figure 3:
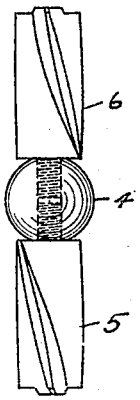
Figure 3 is a side view of the valve.
Figure 4:
Figure 4 is an end view.

Referring now more particularly to the drawings, the numeral 1 designates a depending sleeve onto the upper end of which the open cage 2 is screwed. Clamped between the sleeve and cage there is a valve seat 3. Confined within the cage and co-operating with the seat there is a ball valve 4. A plurality of spiralled fins 5 formed integrally depend from the valve and similar fins 6 upstand therefrom. The fins are secured to the valve in any desired manner, preferably through a threaded stem which is screwed into a tapped hole in the valve.

The fins 5 work through the seat 3 and the fins 6 work through the annular guide 7 in the cage and thus hold the valve in proper position but permit it to work up and down.

The upper end of the cage is reduced and threaded to receive the lower end of the sucker rod through which the pump is operated. Upon the down stroke the valve is lifted and the fins being spiralled will be rotated by the fluid, thus rotating the valve. Each down stroke causes a partial rotation of the valve.

The fins 5 fitting closely in the seat, will, by their rotation, sweep out the sand and other deleterious matter having a tendency to collect therein and the fins 6 will in a similar manner keep the cage cleaned.

The rotation of the valve, as it works, will cause it and the seat to wear uniformly and to form a perfect fit and thus prevent leakage.

When the underside of the valve becomes worn the valve may be readily reversed and its life thereby virtually doubled.

What I claim is:—

1. A valve having an upstanding and a depending spiralled fin, the upper and lower sides of the valve, and the fins carried thereby, being similar to permit the reversal of the valve.

2. A ball valve having depending and upstanding spiralled members of similar formation which operate against the fluid to rotate the valve.

3. The combination with a valve seat of a valve cage fitted thereon, a reversible valve co-operating with the seat, a depending spiralled member attached to the valve and working through said seat, and an upstanding spiralled member attached to the valve and working in the cage.

4. The combination with a valve seat of a valve cage fitted thereon, a reversible valve co-operating with the seat, a depending spiralled member attached to the valve and working through said seat, an upstanding spiralled member attached to the valve and working in the cage, said members being formed to permit the reversal of the valve and a guide in said cage, through which said upstanding member works.

In testimony whereof I have signed my name to this specification in the presence of two subscribing witnesses.

JAMES W. SANDLIN.

Witnesses:
OSCAR L. MCCULLOUGH,
JOSEPH H. BYERS.